June 22, 1926.
J. E. SELTZER
AIR TEMPERING DEVICE
Filed July 15, 1925
1,589,865
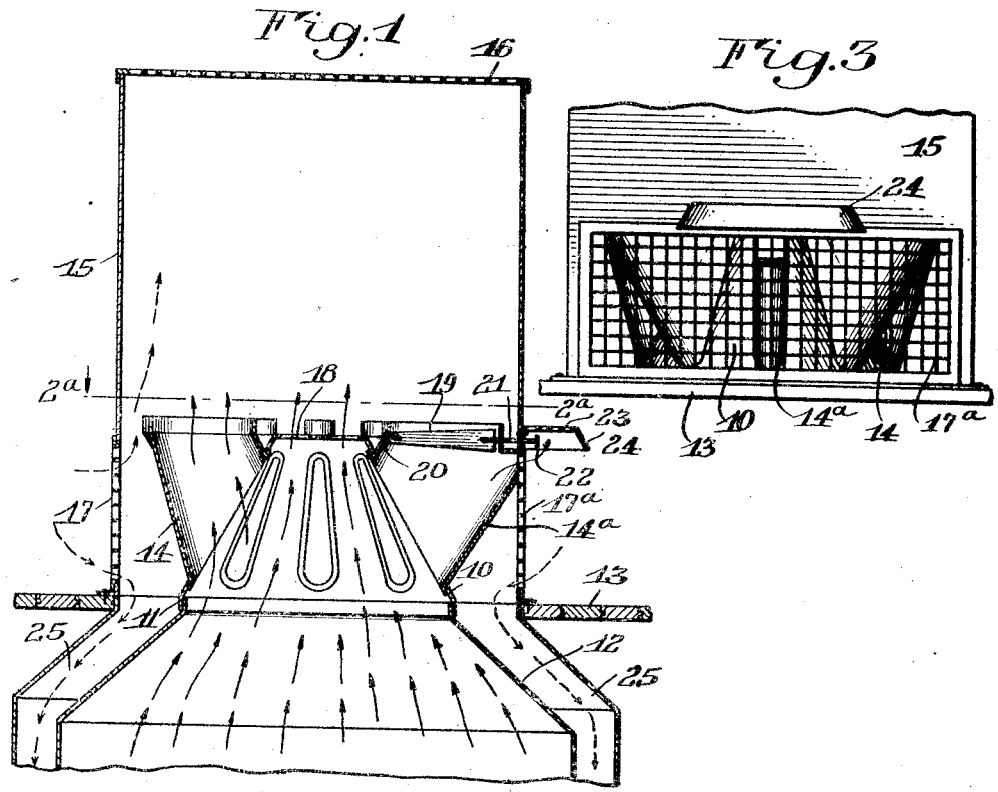
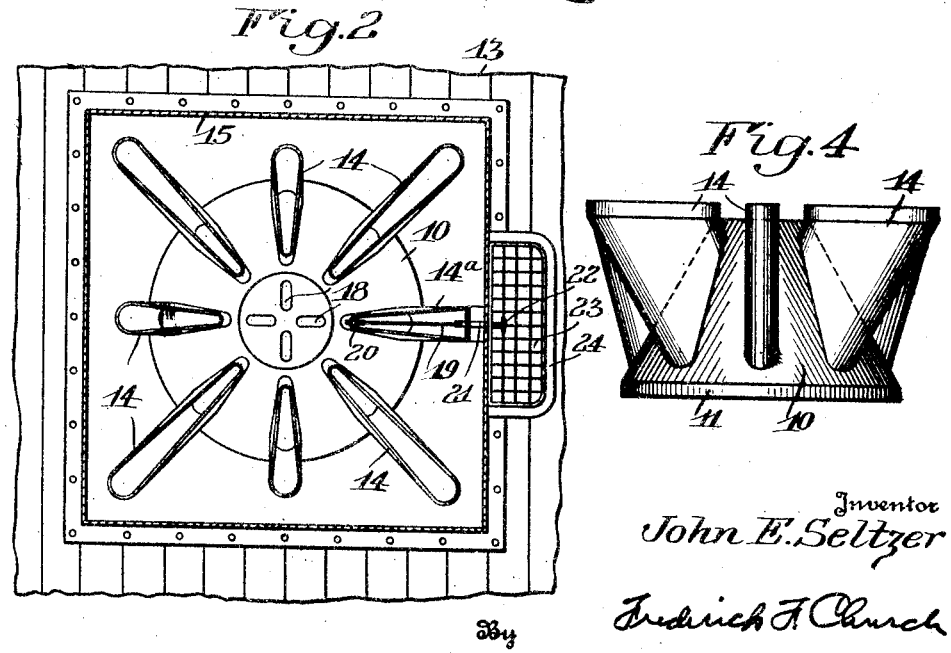
Inventor
John E. Seltzer
By Frederick F. Church
his Attorney Patented June 22, 1926.

1,589,865

UNITED STATES PATENT OFFICE.

JOHN E. SELTZER, OF FLINT, MICHIGAN.

AIR-TEMPERING DEVICE.

Application filed July 15, 1925. Serial No. 43,798.

The present invention relates to an air tempering device, and has for its object to provide an improved device for use with the outlet pipes of hot air furnaces or other hot air supply pipes whereby a more satisfactory distribution and better mixing of the highly heated air with the cold air of a room is afforded.

A further object of the invention is to provide an improved hot and cold air mixing and distributing device in combination with means for deflecting a portion of the unmixed heated air to afford, at a predetermined point, a warming device which may be used for different purposes, such as a foot warmer.

A further object of the invention is to provide a practical, comparatively inexpensive and highly efficient hot and cold air mixing and distributing device for use over hot air registers which may be readily attached or removed when desired.

To these and other ends the invention resides in certain improvements and combinations of parts, all as will be hereinafter more fully described, the novel features being pointed out in the claims at the end of the specification.

In the drawings:—

Figure 1 is a vertical section embodying the invention;

Figure 2 is a horizontal section taken on line 2ª—2ª of Figure 1;

Figure 3 is a fragmentary side elevation looking at the right side of the casing, as viewed in Figure 2, and Figure 4 is a detail view in elevation illustrating the distributor shown in section in Figure 1.

Similar reference numerals throughout the several views indicate the same parts.

The present hot and cold air mixing and distributing device embodies a tapered or cone shaped body member 10 having a flanged base portion 11 adapted to fit or be positioned over the upper or outer end of a hot air supply pipe 12, the latter, in the present instance, being shown extended to a point substantially flush with the floor or other wall 13 of a room as indicated in Figure 1. Projecting outwardly and upwardly from the body member 10 at an angle thereto are a plurality of flues 14, preferably elongated in cross-section and angularly disposed around the body as shown in Figures 2 and 4. The flues are so shaped and positioned upon the body member as to effectively direct the heated air upwardly and outwardly in relatively thin streams or currents toward the four walls of a casing 15 surrounding the distributor and having a perforated cover 16 for the escape of the air to the room. At the bottom of the casing and preferably on each side thereof is a grid or perforated plate, one being shown at 17 and another at 17ª through which cold air from the room is drawn by the separate currents of heated air from the flues 14, said currents by being directed outwardly and upwardly serving to more effectively increase the suction of the cold air upwardly through the casing and at the same time affording a better mixing of the hot and cold air and consequently a better or more even distribution of the heat over the entire room. The flues 14 not only serve to break up the main supply of heated air into relatively thin streams directed away from the center of the flue but each lies in the path of a cold air current produced by the suction of the heated air current so that the hot air is cooled both before and after leaving the flues, in the latter instance by intermingling with the cold air. It can be readily seen therefore that the device is highly efficient in mixing the hot and cold air since each hot air current produces a correspondingly cold air current, the latter enveloping the former in its passage upwardly through the top of the casing.

If preferred the top of the tapered body member 10 may be provided with one or more relatively small openings 18 through which a limited amount of hot air may pass upwardly between the currents produced by the flues 14, the passage of the heated air being indicated by the full line arrows and that of the cold air by the dotted line arrows.

In connection with the distributor shown in Figure 4, I have utilized one of the flues, 14ª, to provide warming means which may be used as a foot warmer or for warming or heating different articles as may be desired. In carrying out this idea I provide a damper 19 in the top of the flue 14ª which is supported at one end by a member 20 pivotally disposed in the wall of said flue. The opposite end of the damper is supported by a member 21 also pivotally disposed in said flue wall and projected through the wall of the casing and provided with an operating handle 22. The handle is preferably disposed beneath a grated rest or perforated plate 23 suitably secured to the casing and having a downwardly extending flange 24 around its outer edge. The outer end wall of the flue 14ª is inclined so that it will terminate a short distance below the foot rest 23 and below the top of the grid 17ª, so that when the damper 19 is closed the hot air entering the flue 14ª will be directed upwardly to the foot rest through the top of the grid 17ª. When, however, the damper is open as shown in Figure 1 the greater portion of the heated air entering the flue 14ª will pass upwardly through the top thereof and into the casing 15. The foot rest is preferably provided with perforations for the passage of the heated air therethrough but these may be omitted if desired.

While I have shown the invention in connection with a pipeless furnace, as indicated by the return pipes or ducts 25 for the cold air it will be understood that the distributor is equally adapted for use with an ordinary pipe furnace or one having no return air ducts, since this feature is not essential to the efficient operation of the invention.

The distributor shown in Figure 4 constitutes a complete unit which can be easily applied to and removed from a register or the discharge end of a furnace pipe, or connection leading therefrom, and is highly efficient in breaking up the heated air into thin streams so that it will become more perfectly mixed with the cold air drawn into the casing by said streams.

I claim as my invention:

1. The combination with a wall of a room and a hot air pipe leading to an opening in said wall, of a distributor adapted to receive the heated air from said pipe having a plurality of flues arranged to divide and discharge the heated air outwardly from the center of the pipe in separate currents, and a casing surrounding the distributor having openings through which said hot air currents are adapted to draw air from the room whereby to effectively mix the latter with the heated air.

2. The combination with a wall of a room and a hot air pipe leading to an opening in the wall, of a distributor adapted to be positioned over the outlet end of said pipe comprising a body member having a plurality of angularly disposed flues inclined relative to the body member and adapted to direct the heated air outwardly and upwardly in separate currents, a casing surrounding the distributor having inlet openings through which said hot air currents are adapted to draw air from the room whereby to effectively mix the latter with the heated air adjacent the outer end of the distributor.

3. The combination with a wall of a room and a hot air pipe leading to an opening in said wall, of a distributing unit adapted to be positioned over the discharge end of said pipe and comprising a tapered body member having a plurality of angularly disposed flues connected therewith and adapted to divide the heated air received thereby into separate outwardly directed currents and a casing secured to said wall into which said currents are discharged, the casing having inlet passages through which the currents are adapted to draw air from the room whereby to effectively mix the latter with the heated air, said casing also having outlet passages for the discharge of the mixed currents of air.

4. The combination with a wall of a room and a hot air pipe leading to an opening in said wall, of a distributing unit adapted to be positioned over the discharge end of said pipe and comprising a frustro-conical member having a series of angularly disposed flues elongated in cross-section and adapted to direct separate currents of heated air received thereby upwardly and outwardly from the center thereof, and a casing secured to said wall and surrounding said distributor and having inlet passages through which the heated air currents are adapted to draw air from the room and also having discharge passages for the mixed air.

5. The combination with a wall of a room and a hot air pipe leading to an opening in said wall, of a distributor adapted to be positioned over the outlet end of said pipe having a plurality of flues adapted to divide and discharge the heated air outwardly in separate currents, a casing surrounding the distributor having perforations through which said hot air currents are adapted to draw air from the room, and means adjustable to divert the air from one of said flues through an opening in the side of the casing.

6. The combination with a wall of a room and a hot air pipe leading to an opening in said wall, of a distributor adapted to be positioned over the outlet end of said pipe having a plurality of flues adapted to divide and discharge the heated air outwardly in separate currents, a casing surrounding the distributor having perforations through which said hot air currents are adapted to draw air from the room, means adjustable to divert the air from one of said flues through an opening in the side of the casing, and a perforated member disposed over said opening forming a foot rest through which the heated air is adapted to pass from the last mentioned flue.

7. As an article of manufacture, a distributor adapted for use over the discharge end of a hot air pipe leading to a room from a furnace comprising a unit embodying a tapered body portion having a plurality of angularly disposed and outwardly inclined tubes of elongated cross section having their free ends so disposed as to discharge the gases in substantially parallel streams.

JOHN E. SELTZER.